(No Model.) 2 Sheets—Sheet 1.

B. DEVLIN.
AUTOMATIC STEAM BOILER FEEDER.

No. 439,484. Patented Oct. 28, 1890.

WITNESSES:
N. R. Davis
E. M. Clark

INVENTOR:
B. Devlin
BY
Munn & Co
ATTORNEYS (No Model.) 2 Sheets—Sheet 2.

B. DEVLIN.
AUTOMATIC STEAM BOILER FEEDER.

No. 439,484. Patented Oct. 28, 1890.

WITNESSES: Fig. 6.
W. R. Davis
E. M. Clark

INVENTOR:
B. Devlin
BY
Munn & Co
ATTORNEYS

UNITED STATES PATENT OFFICE.

BERNARD DEVLIN, OF JERSEY CITY, NEW JERSEY.

AUTOMATIC STEAM-BOILER FEEDER.

SPECIFICATION forming part of Letters Patent No. 439,484, dated October 28, 1890.

Application filed July 21, 1890. Serial No. 359,358. (No model.)

*To all whom it may concern:*

Be it known that I, BERNARD DEVLIN, of Jersey City, in the county of Hudson and State of New Jersey, have invented a new and Improved Automatic Steam-Boiler Feeder, of which the following is a full, clear, and exact description.

My invention has for its object to provide simple, inexpensive, and reliable devices for automatically supplying steam-boilers with feed-water, and to be used with any suitable water-forcing device which will overcome the boiler-pressure—such as a pump or injector—whereby safety against injury or explosion of a boiler or battery of boilers from low water is assured without requiring constant attention of the engineer.

The invention will first be described, and then will be particularly pointed out in the claims.

Reference is to be had to the accompanying drawings, forming a part of this specification, in which similar letters of reference indicate corresponding parts in all the figures.

Figure 1:
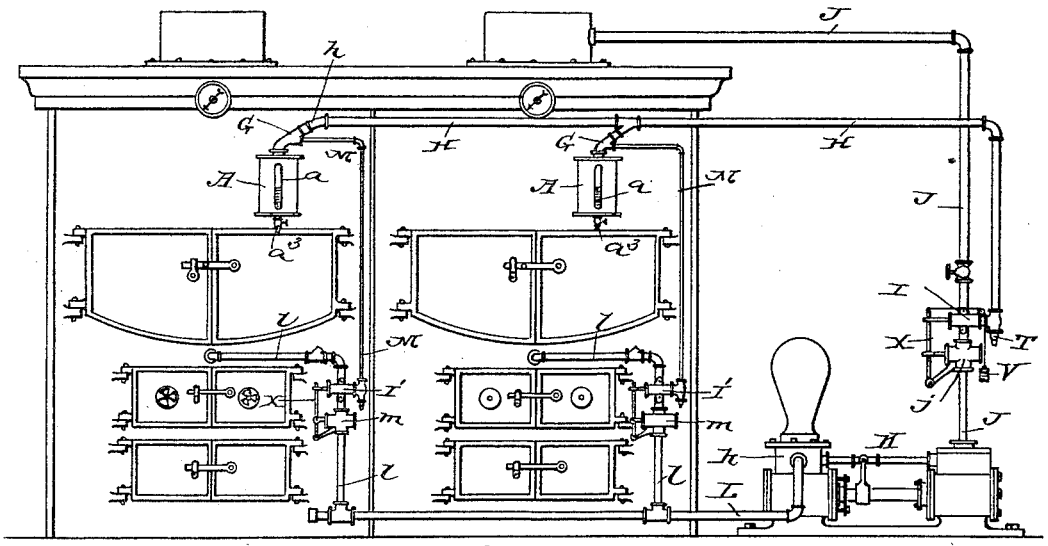
Figure 2:
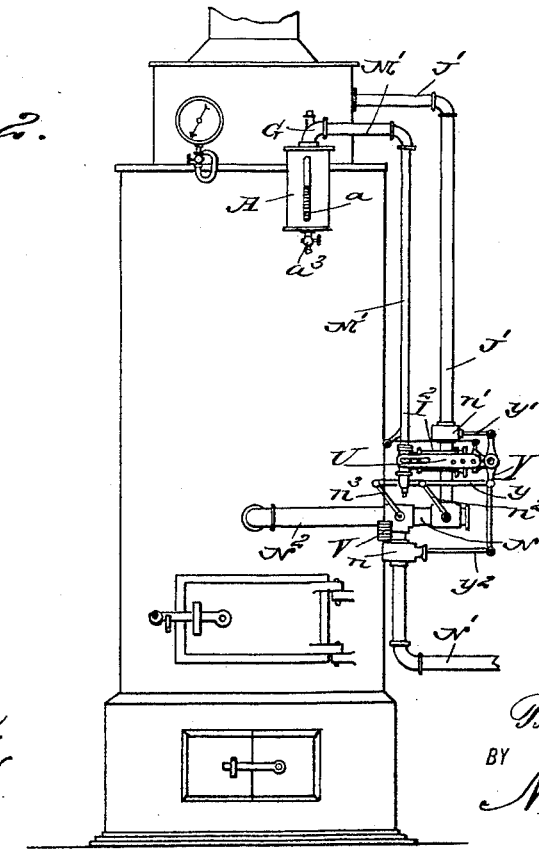
Figure 3:
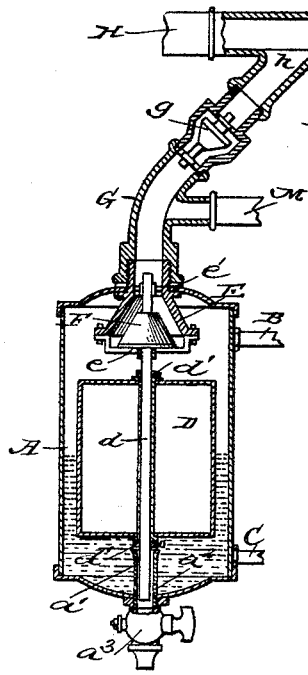
Figure 4:
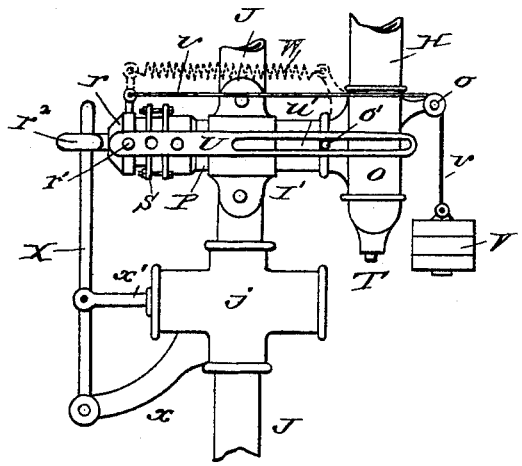
Figure 5:
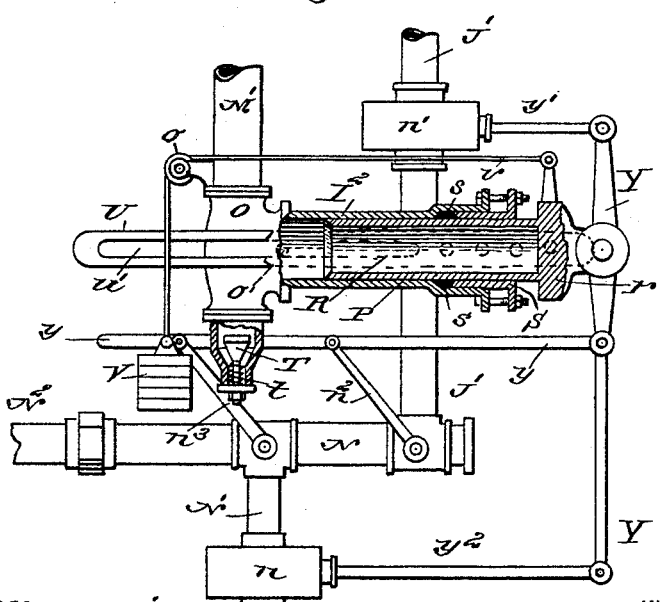

Figure 1 is a front view of a pair of steam-boilers and a feed-pump therefor with my improvement applied. Fig. 2 is a front view of an upright steam-boiler, showing my improvement applied to control an injector feed device. Fig. 3 is an enlarged front sectional view of the valved regulating drum or casing and portions of the connected steam-pipes, as arranged in Fig. 1 of the drawings. Fig. 4 is an enlarged front view of the steam-actuated regulator device shown in connection with the pump in Fig. 1. Fig. 5 is an enlarged partly-sectional front view of the steam-actuated regulator in connection with the injector feed device shown in Fig. 2 of the drawings; and Fig. 6 is a side view of the regulator-piston stop bar or device.

In the care or management of steam-boilers it is most desirable to make the feed of water to them depend on the operation of reliable automatically-working devices which will maintain an approximately-uniform level of water in one or more boilers without requiring constant watchfulness of the attendants or depending on them for the safety of the boilers against injury or explosion from low water.

In Fig. 1 of the drawings I show the fronts of a pair of ordinary horizontal tubular boilers and a common steam-pump which supplies them with water, while in Fig. 2 is represented an ordinary upright tubular boiler which is fed with water by means of an injector device. I will particularly describe these in the order named and as fitted with my improved automatic feed regulating or controlling mechanisms.

To the front of each of the horizontal boilers is connected a drum or casing A by means of upper and lower pipes B C, which respectively open to the steam and water spaces of the boiler. The drum is preferably fitted with an ordinary gage-glass $a$, which indicates the level of water in the drum and also in the boiler. Within the drum is placed a suitable float D, which has a vertical shaft or spindle $d$, guided in a tubular bearing $a'$ at the bottom of the drum and in an upper cross-bar or bridge-piece $e$ and a spider or skeleton bearing $e'$, both fixed to a hollow fitting E, which is flared downward from the top of the drum, to which it is suitably fastened. The flared lower portion of the fitting E forms a seat for an upwardly-tapered or conical valve F, which is fixed to the float-spindle, and when down or open rests upon the bridge-bearing $e$, which is held across the lower end of the fitting E. Suitable collars or washers $d'$ $d'$ on the spindle $d$ maintain the float D in proper relation to the valve F and its seat E to cause the float when lifted by rising water in the drum to close the valve and thereby cut off flow of steam from the upper part of the drum to a pipe-fitting G, which is connected to the top of the drum, and preferably by screwing it onto an upwardly-projecting threaded extremity of the valve-seat fitting E. The float-spindle guide $a'$ in the drum A is provided with side holes $a^2$ next the bottom of the drum to give outlet of water to a blow-off cock $a^3$, held to the drum, whenever a blow-off cleaning of the drum is desirable or necessary.

To the pipe-fitting G is coupled another fitting containing a check-valve $g$, and to this fitting is coupled another one $h$, which is connected to a steam-pipe H, which leads to the regulator I, which controls the steam-inlet valve $j$ in a steam-supply pipe J, which leads from one of the boilers to the valve-chest of the feed-pump K from the water-chamber $k$, of which a feed-pipe L and its branches $l\ l$ lead to supply both of the horizontal boilers with water.

To a nipple on the pipe-fitting G, between the drum-valve E and the check-valve $g$, is coupled another steam-pipe M, which leads to a regulator I' like the one I, with which the pipe H connects at the pump steam-inlet pipe. This regulator I' is shown bolted or clamped to the boiler-feed pipe $l$, but it may be sustained from the boiler-front or otherwise, provided it control a gate-valve $m$ like the one $j$ in the pump-steam pipe J. A pipe M and regulator I' are provided between the drum A and water-feed valve $m$ of each of the boilers shown and for any number of boilers which would be set up in a battery. The drum A and pipe and valve connections shown in Fig. 3 of the drawings are those shown on the boiler nearest the steam-pump K. Should there be more than two boilers set side by side, the pipe H would run on to connect with the check-valved fitting G of each boiler, as will readily be understood.

The regulator devices I I' above named and also the device I$^2$, which controls the injector feeding the upright boiler in Figs. 2 and 5 of the drawings, are made alike and will be particularly described with more special reference to Figs. 4 and 5 of the drawings, the former showing the regulator for the steam-feed pump-valve and the latter the regulator for the injector feed device. I will here state that the regulator I$^2$ receives steam from the drum A on the upright boiler through a pipe M', and a steam-pipe J' connects the steam space or dome of the boiler with the injector N, to which is coupled also the feed-water-supply pipe N', which may have a valve $n$, controlled by the regulator I$^2$ and admitting water to the injector, which discharges it through a pipe N$^2$ into the boiler. A valve $n'$ may also be fitted into the steam-pipe J' near the regulator I$^2$ to be controlled by it simultaneously with its control of the main water-inlet valve $n$, as hereinafter more fully explained.

Referring now more especially to Fig. 5 of the drawings it will be seen that the regulator is made with a hollow rear chamber O, having a T form, and from the side of which projects a cylinder P, into which is fitted a piston R, which is preferably made as a cylinder closed at its outer end by a head $r$, and surrounded by a packing $s$, pressed inward by an ordinary gland S to assure a steam-tight joint of the hollow piston in the cylinder. One end of the chamber O is fixed to the steam-supply pipe leading from the drum, in this case the pipe M', and to the other end of the chamber is fitted a check or relief valve T, which closes by pressure from said pipe. This valve T is normally held open by a suitable spring, a spiral spring $t$ on its stem being shown for this purpose.

I employ a stop device to limit the outward movement of the piston P by pressure of steam from the pipe M', and for this purpose I prefer to use a metal stop-bar U, (shown in Fig. 6 of the drawings,) having a series of holes $u$, any one of which may be engaged with a pin $r'$ on the head $r$ of the piston. The stop-bar also has a slot $u'$, which rides along or over a pin or stud $o'$ on the chamber O of the regulator. By setting different holes $u$ of the bar U over the pin $r'$ the back end of the slot $u'$ will strike the pin $o'$ sooner or later to limit the stroke of the regulator-piston, as may be desired.

I provide a retracting device for the regulator-piston, which may be a weight V, connected to a cord $v$, running over a pulley $o$ on the regulator-chamber O and connected to the head $r$ of the piston, or may be a spring W, connecting the piston-head and chamber, as indicated by dotted lines in Fig. 4 of the drawings.

When the regulator is employed to control the steam-valve $j$ of the pump or the feed-water-supply or gate valve $m$ of one of the boilers, the valve-casing will have an arm $x$, to which is fulcrumed one end of a lever X, which is suitably connected to the stem $x'$ of the valve, and is engaged by an eye $r^2$ on the head $r$ of the regulator-piston R, and whereby as the piston is moved outward by steam-pressure the valve $j$ or $m$ will be opened. When an injector feed device is used instead of a pump, and as shown in Figs. 2 and 5 of the drawings, the head $r$ of the regulator-piston R will be provided with a rigid arm Y, which connects by a rod or link $y$ with arms or levers $n^2\ n^3$ of valves which admit steam and water, respectively, to the injector from the pipes J' N'. When I use the main supply-valves $n'\ n$ in the steam and water pipes, I connect their stems $y'\ y^2$ to extensions of the rigid arm Y to operate them simultaneously with the operation of the steam and water admission valves of the injector, and thereby obviate the necessity of opening said main steam and water supply valves by the engineer or attendant. If desired, the piston-retracting weight or spring device may be connected directly to the end of the lever X, as shown, with the pump-regulator I, in Fig. 1 of the drawings.

The operation of my improved boiler-feeder or feed-water regulator is very simple and effective. When it is used with two or more steam-boilers supplied with water from the pump K, and as shown in Figs. 1, 3, and 4 of the drawings, it is obvious that when the water-level in one of the boilers falls, and thereby lowers the float D and its valve F in the communicating drum A, steam from the upper part of the drum will pass out through the valve-seat E and into the pipe G, and along the pipes H M to their respective regulators I I' at the pump K and boiler-feed pipe $l$. The pressure of the steam in the pipes H M will at once close the valves T of the regulators I I' and force the regulator-pistons R outward, thereby opening the valve *j* to admit steam to the pump K to start it, and at the same time opening the valve *m* on the feed-pipe L or its branch *l* to admit water to the boiler from the pump. When the water rises in the boiler to the proper predetermined level, the float will have risen in the drum A and will close its valve F to its seat E, and thereby cut off flow of steam from the drum to the pipes H M, and as steam-pressure is cut off from these pipes the retracting weights or springs of the regulators I I' will draw back their pistons R, as the steam which had forced them outward finds its escape past the relief-valves T of the regulators, which are opened automatically by their springs *t* as soon as the boiler-pressure is cut off from the pipes H M by the drum-valve F. As the pistons are retracted, their connected valves *j m* will be closed and steam will be cut off from the pump while water is cut off from the boiler.

Should a battery of two or more boilers be used, each boiler will be fed with water by the pump independently of any or every other boiler. In this case the check-valve *g* at the boiler or boilers in which the water stands at proper level will be closed by steam-pressure in the pipe H, so as not to prevent free operation of the drum-valves F at said boiler or boilers. When all boilers of the battery are filled to proper water-level, the feeding-pump will stop as its valve *j* will remain closed; but so long as any one or more of the boilers need water, steam admitted to the pipe H will, through the regulator I, open the valve *j* or hold it open to start or work the pump until all the boilers are properly supplied.

In using the injector feed device shown in Figs. 2 and 5 of the drawings, steam admitted to the pipe M' past the open valve F in the drum A will close the valve T of the regulator I² and then force its piston R outward, thereby carrying the arm Y outward and opening the main steam and water supply valves *n' n* and also the injector steam and water valves and starting the injector to force the feed-water through the pipe N² to the boiler, the valve T of the regulator being closed during this operation. As the water rises in the upright boiler and lifts the float in the drum A and closes the valve F to the seat E, and thereby cuts off flow of steam to the pipe M', the relief-valve T will open again and will allow the retracting weight or spring to pull back the piston R and with it the rods *y y' y²*, and thereby cut off steam and water from the injector and also close the injector-valves and stop the feeding of water to the boiler, as will readily be understood.
Having thus fully described my invention, I claim as new and desire to secure by Letters Patent—

1. The combination, in an automatic steam-boiler feeder, of a drum communicating with the steam and water spaces of the boiler, a float-valve in the drum adapted to cut off flow of steam thereto from the boiler, a valved water-supply pipe in communication with the boiler, a piston device arranged relatively with the water-supply-pipe valve to open and close it as the piston is actuated, said piston device provided with a self-opening relief-valve, and a steam-supply pipe connecting the drum with said valve-controlling piston device, substantially as described.

2. The combination, in an automatic steam-boiler feeder, of a drum communicating with the steam and water spaces of the boiler and provided with a water-gage, a float-valve in the drum adapted to cut off flow of steam thereto from the boiler, a valved water-supply pipe in communication with the boiler, a piston device arranged relatively with the water-supply-pipe valve to open and close it as the piston is actuated, said device provided with a self-opening relief-valve, and a steam-supply pipe connecting the drum with said valve-controlling piston device, substantially as described.

3. The combination, in an automatic steam-boiler feeder, of a drum communicating with the steam and water spaces of the boiler, a float-valve in the drum adapted to cut off flow of steam thereto from the boiler, a valved water-supply pipe communicating with the boiler, a piston device arranged relatively with the water-supply-pipe valve to open and close it as the piston is actuated, said piston device provided with a self-opening relief-valve, a pipe connecting the steam-space of the drum with said piston device, and a water-forcing device in connection with the water-supply pipe, substantially as described.

4. The combination, in an automatic steam-boiler feeder, of a drum communicating with the steam and water spaces of the boiler, a float-valve in the drum adapted to cut off flow of steam thereto from the boiler, a valved water-supply pipe communicating with the boiler, a piston device arranged relatively with the water-supply-pipe valve to open and close it as the piston is actuated, said piston device provided with a self-opening relief-valve, a water-forcing device in connection with the water-supply pipe, and a pipe connecting the steam-space of the boiler with said water-forcing device, substantially as described.

5. The combination, in an automatic steam-boiler feeder, of a drum communicating with the steam and water spaces of the boiler and provided with a water-gage, a float-valve in the drum adapted to cut off flow of steam thereto from the boiler, a valved water-supply pipe communicating with the boiler, a piston device arranged relatively with the water-supply-pipe valve to open and close it as the piston is actuated, said piston device provided with a self-opening relief-valve, a pipe connecting the steam-space of the drum with said piston device, a water-forcing device in connection with the water-supply pipe, and a pipe connecting the steam-space of the boiler with said water-forcing device, substantially as described.

6. The combination, in an automatic steam-boiler feeder, of a drum communicating with the steam and water spaces of the boiler, a float-valve in the drum adapted to cut off flow of steam thereto from the boiler, a valved water-supply pipe communicating with the boiler, a piston device arranged relatively with the water-supply-pipe valve to open and close it as the piston is actuated, a pipe connecting the steam-space of the drum with said piston device, a water-forcing device in connection with the water-supply pipe, a steam-supply pipe connected with said water-forcing device, and an auxiliary piston device controlling the valve of the last-named steam-pipe, substantially as described.

7. The combination, in an automatic steam-boiler feeder, of a drum communicating with the steam and water spaces of the boiler, a float-valve in the drum adapted to cut off flow of steam thereto from the boiler, a valved water-supply pipe communicating with the boiler, a piston device arranged relatively with the water-supply-pipe valve to open and close it as the piston is actuated, a pipe connecting the steam-space of the drum with said piston device, a water-forcing device in connection with the water-supply pipe, a valved pipe connecting the steam-space of the boiler with said water-forcing device, and an auxiliary piston device controlling the valve of the steam-pipe connecting the boiler with said water-forcing device, substantially as described.

8. The combination, in an automatic water-feeding device for two or more boilers, of a drum on each boiler and communicating with its water and steam spaces, a float-valve in each drum adapted to cut off flow of steam thereto from its boiler, a water-supply pipe valved at each boiler, a piston device arranged relatively with the water-supply-pipe valve of each boiler to open and close it as the piston is actuated, a steam-supply pipe ranging along the boilers, fittings connecting each boiler-drum to said pipe and provided with a check-valve preventing back-pressure to the drums from the steam-supply pipe, and a steam-supply pipe connecting each drum or its outlet-fitting at a point inside the check-valve with the piston device controlling the water-supply pipe of each boiler, substantially as described.

9. The combination, in an automatic water-feeding device for two or more boilers, of a drum on each boiler and communicating with its water and steam spaces, a float-valve in each drum adapted to cut off flow of steam thereto from its boiler, a water-supply pipe valved at each boiler, a piston device arranged relatively with the water-supply-pipe valve of each boiler to open and close it as the piston is actuated, a steam-supply pipe ranging along the boilers, fittings connecting with each boiler-drum to said pipe and provided with a check-valve preventing back-pressure to the drums from the steam-supply pipe, a steam-supply pipe connecting each drum or its outlet-fitting at a point inside the check-valve with the piston device controlling the water-supply pipe of each boiler, and a water-forcing device in connection with the water-supply pipe common to all the boilers, substantially as described.

10. The combination, in an automatic water-feeding device for two or more boilers, of a drum on each boiler and communicating with its steam and water spaces, a float-valve in each drum adapted to cut off flow of steam thereto from its boiler, a water-supply pipe valved at each boiler, a piston device arranged relatively with the water-supply-pipe valve of each boiler to open and close it as the piston is actuated, a steam-supply pipe ranging along the boilers and fittings connecting each boiler-drum to said pipe, said fittings or drums provided with a check-valve preventing back-pressure to the drums from the steam-supply pipe, a steam-supply pipe connecting each drum or its outlet-fitting at a point inside the check-valve with the piston device controlling the water-supply pipe of each boiler, a water-forcing device in connection with the common water-supply pipe to all the boilers, a valved steam-inlet pipe to said water-forcing device, and an auxiliary piston device controlling the valve of the latter steam-inlet pipe, substantially as described.

11. In an automatic water-feeding device for steam-boilers, the combination, with a boiler, of a drum A, having pipe-connections B C with its steam and water spaces and provided at its upper part with a tapering valve-seat E, which has a lower bridge-piece e and an upper skeleton bearing e', said drum having at its lower part a bearing a', a spindle d, guided in the parts a' e e' and provided with a tapering valve F, adapted to the seat E and to rest on the bridge e of said seat, and a float D, held adjustably on the spindle d, all arranged for operation substantially as herein set forth.

12. In an automatic water-feeding device for steam-boilers, the combination, with a boiler, of a drum A, having a valve-seat E, pipes B C, connecting the drum with the boiler, a float-valve device d D F in the drum, a valved feed-water pipe, a piston-regulator device O P R, having a relief-valve T and connected with the water-feed valve, a retracting device for the regulator-piston, and a steam-supply pipe connecting the drum with the piston device, substantially as described.

13. In an automatic water-feeding device for steam-boilers, the combination, with a boiler, of a drum A, having a valve-seat, pipes B C, connecting the drum with the boiler, a float-valve device d D F in the drum, a valved feed-water pipe, a piston-regulator device O P R, having a relief-valve T and connected with the water-feed valve, a retracting device for the regulator-piston, a steam-supply pipe connecting the drum with the piston device, a water-forcing device at the feed-pipe, a valved steam-supply pipe connected with said water-forcing device, and a piston-regulator O P R T, controlling the valve of the last-named steam-pipe, substantially as described.

14. In automatic water-feeding devices for steam-boilers, an auxiliary piston device adapted for operation with a valved water or steam supply pipe and consisting of a chamber O, having a valve-seat at its open end and adapted for connection to a steam-supply pipe, a cylinder P, opening to said chamber, a piston working in the cylinder, a relief and check valve T at the valve-seat of the chamber O, and a spring or device normally opening said valve when steam-pressure is taken from it, substantially as herein set forth.

15. In automatic water-feeding devices for steam-boilers, the combination, with a valved steam or water-feed pipe, of a piston-regulator device consisting of a chamber and cylinder O P, a piston R in the cylinder, a retracting device for the piston, a connection between the piston and pipe-valve, a stop device U, slotted at $u'$ and held to the piston, and a relatively-fixed pin entering the slot $u'$ of the stop device, substantially as described.

16. In an automatic water-feeding device for steam-boilers, the combination, with a battery of boilers, of a drum on each boiler having a valve-seat, pipes connecting each drum with the water and steam spaces of its boiler, a float-valve in each drum, valved water-feed pipes for the boilers, a piston-regulator device controlling the feed-valve of each boiler, a steam-pipe connecting each boiler-drum with its feed-regulating piston device, a feed-pump, a steam-supply pipe leading thereto and connecting with all the boiler-drums, and check-valves in the fittings connecting the drums and steam-pipe and preventing back-pressure therefrom to the drums, substantially as described.

17. In an automatic water-feeding device for steam-boilers, the combination, with the boiler, of a drum having a valve-seat and communicating with the water and steam spaces of the boiler, a float-valve in the drum, a water-feed pipe connected to the boiler, an injector feeding device on said pipe, a piston-regulator device having a relief-valve and piston-retractor, a steam-supply pipe connecting the drum and regulator-piston, connections between the piston and the injector-valves, and a steam-pipe connecting the boiler and injector, substantially as described.

18. In an automatic water-feeding device for steam-boilers, the combination, with the boiler, of a drum having a valve-seat and communicating with the water and steam spaces of the boiler, a float-valve in the drum, a water-feed pipe connected to the boiler, an injector feeding device on said pipe, a piston-regulator device having a relief-valve and piston-retractor, a steam-supply pipe connecting the drum and regulator-piston, connections between the piston and the injector-valves, a steam-pipe connecting the boiler and injector main supply-valves in the feed-water and steam pipes, and connections from said main valves to the regulator-piston, substantially as described.

BERNARD DEVLIN.

Witnesses:
HENRY L. GOODWIN,
EDGAR TATE.